United States Patent [19]
Huber

[11] Patent Number: 5,803,936
[45] Date of Patent: Sep. 8, 1998

[54] REACTOR FOR THE CONTINUOUS PRODUCTION OF A FLAMMABLE GAS

[76] Inventor: Jakob Huber, 8 Chemin des Avenyers, 1806 St. Legier, Switzerland

[21] Appl. No.: 721,117

[22] Filed: Sep. 26, 1996

[30] Foreign Application Priority Data

Sep. 27, 1995 [CH] Switzerland .......................... 02724/95

[51] Int. Cl.⁶ .............................. B01J 7/00; F02B 43/00; F23G 5/12
[52] U.S. Cl. .................................... 48/61; 48/117; 48/85; 48/77; 48/63; 60/39.12; 60/39.35; 110/229; 110/246
[58] Field of Search .................................. 48/61, 117, 85, 48/63, 77; 60/39.12, 39.35; 110/229, 246

[56] References Cited

U.S. PATENT DOCUMENTS

| | | | |
|---|---|---|---|
| 4,069,024 | 1/1978 | Fernandes | 48/197 R |
| 4,282,009 | 8/1981 | Belke et al. | 48/61 |
| 4,306,506 | 12/1981 | Rotter | 110/229 |
| 4,309,195 | 1/1982 | Rotter | 48/76 |
| 4,405,340 | 9/1983 | Küpfer et al. | 48/86 |
| 4,430,444 | 2/1984 | Reichl | 518/703 |
| 4,597,772 | 7/1986 | Coffman | 48/111 |
| 4,601,730 | 7/1986 | McGowan et al. | 48/76 |
| 4,659,340 | 4/1987 | Weaver | 48/76 |
| 4,670,023 | 6/1987 | Schäfer | 48/79 |
| 4,809,624 | 3/1989 | Van Der Burgt | 110/347 |
| 4,854,861 | 8/1989 | Hartweck et al. | 432/14 |
| 4,929,254 | 5/1990 | Kooiman et al. | 48/76 |
| 4,955,190 | 9/1990 | Robertson, Jr. | 60/39.02 |
| 5,028,241 | 7/1991 | Kooiman et al. | 48/87 |
| 5,096,463 | 3/1992 | Beierle et al. | 48/76 |
| 5,139,535 | 8/1992 | Strickland et al. | 48/76 |
| 5,236,470 | 8/1993 | Levin | 48/210 |
| 5,372,618 | 12/1994 | Andrus, Jr. | 48/87 |

*Primary Examiner*—Ardin H. Marschel
*Assistant Examiner*—Jezia Riley
*Attorney, Agent, or Firm*—Bell Seltzer Intellectual Property Law Group of Alston & Bird LLP

[57] ABSTRACT

A gasification reactor comprising of a slow turning rotation chamber (1) with tapered end pieces (7) and sealed by stationary closures (8, 9). The chamber is divided by rings (3, 3') into three sections (4, 5, 6). The first section (4) is used to dry and pre-heat the combustible material (12). Section (5) is the gasification zone and section (6) is used to collect and transport the ash to the outside of the chamber. In order to obtain a better insulation against loss of heat an inner cylinder (24) is fitted into the chamber. The feed stock material (12) is brought into the chamber with a hollow piston (13) through the stationary closure (8) and inside the chamber the material is moved along by the rotation of the chamber. Fresh air supply is introduced into the chamber through special form parts (25), and the combustible gas is collected and returned to the outside with the pipe (31). Ash and slag are lifted and deposited in a collector (21) from where they are brought to the outside. A continuous operation is possible, and the gasification process can be pressurized to supply the gas directly to a user without the need for a gas compressor. Almost any solid combustible material can be gasified such as wood, paper, coal in small grain size, plastic, and dry biomass. Small amounts of waste oil can be mixed with the feed stock.

20 Claims, 1 Drawing Sheet

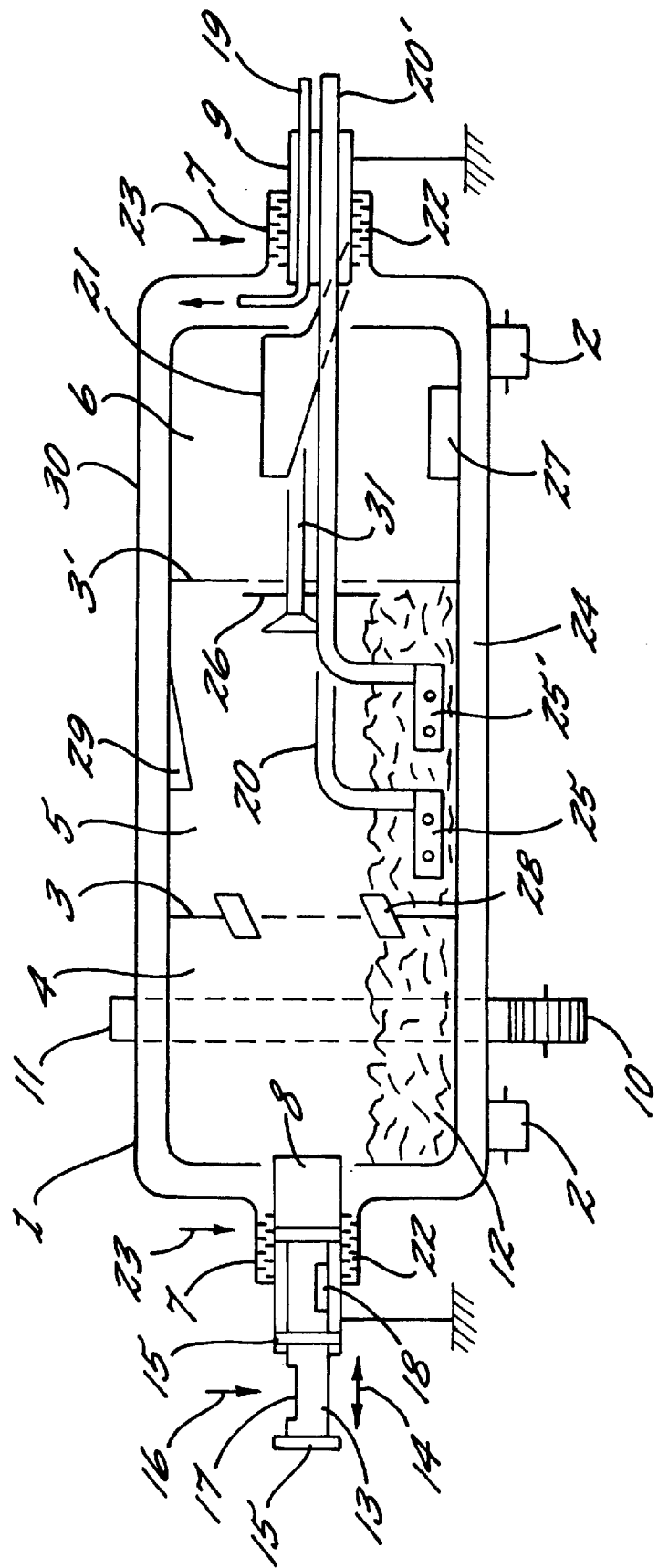

REACTOR FOR THE CONTINUOUS PRODUCTION OF A FLAMMABLE GAS

BACKGROUND

1. Field of Invention

This invention relates to a thermal reactor for continuous production of a flammable gas by controlling an incomplete combustion of solid materials by restricting the air supply.

2. Description of Prior Art

For the production of gas from coal, coal is loaded into a reactor, which is heated from the outside. The gaseous content of the coal is expanding and is piped to the outside of the reactor, and after a secondary process, can be used the same way as natural gas. The process in the reactor produces coke, which has a higher heating value and is widely used in industry and households for heating purposes. The gas travels well in a pipe, can be easily ignited, and has a high heating value.

The process produces a variety of different by-products, which cannot be used in the same manner as described above.

Existing reactors are either of and up draft or a down draft mode. These reactors do not allow to switch from one mode to another without serious modifications, or such modifications are simply impossible.

Over the years different types of wood gasification devices were used and connected to combustion engines. Such gasification required selected types of wood to maintain a steady process. Since the process was halted whenever new wood had to be fed into the gasifier, which resulted in undesired interruptions until the process resumed its production of gas. The loss of power is considerable in a combustion engine where, gas has to be drawn into its cylinders.

OBJECTS AND ADVANTAGES

The present invention is a thermal reactor for continuous production of a flammable gas with almost any combustible material, without interruption in the gas supply or even fluctuation in gas pressure and quality, and which can be regulated by simple means even when the demand of gas varies.

By designing a gas reactor in accordance with the present invention, it is possible to gasify combustible materials, such as various coals, rubber, paper, wood, and other dry plant products. Clean or contaminated oil in small doses can be mixed with the feed stock and can be gasified along with the solid material. The feed is continuous or in small intervals, and the amount of feed stock is in quantities that do not influence the continuous production of gas. The return of gas from the reactor is therefore independent of any feed cycle and can follow the demand of any user. For short interruptions in demand only a minimal quantity of air will be used to maintain the combustion process in the rotating combustion chamber. Therefore, full gas production can be restored fairly quickly without the need for a gas storage vessel. However, the use of such a vessel can still be considered.

The produced gas can be used for different purposes, and if the gas is cleaned accordingly, it is suitable for use in combustion engines.

A significant amount of waste heat is generated during the gasification process, and such heat can be used in several ways.

Mentioned are heating systems for buildings, greenhouses, swimming pools. Additional applications for example are in the textile industries, cleaning institutes, and chemical processes. The feed stock material is utilized to its fullest degree, and the overall efficiency of the gasification process is therefore very high.

DRAWING FIGURES

A sample of such a gas reactor is schematically shown In the drawing.

REFERENCE NUMERALS IN THE DRAWING 1 rotation chamber
2 rolls
3 orifice restriction ring
4 section 1
5 section 2
6 section 3
7 tapered end pieces
8 stationary closure
9 stationary closure
10 drive gear
11 circumference gear ring
12 combustible material
13 cavity piston
14 two directional arrow
15 piston ring
16 arrow
17 opening for feed stock
18 feed opening to chamber
19 pipe for air supply
20 hollow support arm
21 collector
22 multi orifice seal
23 arrow
24 inner cylinder of chamber
25 form part
26 heat shield
27 lifting elements
28 blade
29 agitation edge
30 circulation space
31 pipe for gas

DESCRIPTION

A rotation chamber 1 is supported by rolls 2. Chamber 1 is divided by orifice restriction rings 3, 3' into three sections 4, 5, and 6. A tapered end piece 7 at each end of the chamber is sealed through a stationary closure 8 and 9. The rotation of the chamber is facilitated by a drive gear 10 and a circumference gear ring 11.

Stationary closure 8 contains the feed mechanism for a combustible material 12. Closure 8 is a hollow cylinder and is open on both ends. Inside the cylinder a cavity piston 13 is moving forwards and backwards as indicated by a two directional arrow 14. Cavity piston 13 is guided by three piston rings 15. At least two of the three rings are always inside closure 8, sealing chamber 1 to the outside.

Combustible material 12 cut to the necessary piece size is fed in the direction of an arrow 16 through an opening 17 into cavity piston 13. As soon as the cavity piston protrudes sufficiently into chamber 1 an opening 18 is cleared by closure 8 and material 12 drops into a first section 4 of chamber 1.

For material 12 used in small pieces it can be advantageous to align both openings 17 and 18 on the same side of cavity piston 13. During the horizontal feed motion the openings are located in the upper half of the piston. In order to pour material 12 into section 4 the piston has to be rotated by 180°, which can be easily accomplished.

A stationary closure 9 on the right side of chamber 1 accommodates and supports a pipe 19, a hollow support arm 20 and 20', a collector 21, and a pipe 31. All functions of these elements are explained further in the description.

For the seal between end piece 7 of chamber 1 and closures 7 and 8 any kind of suitable sealing material and design can be used. However, it is advantageous to employ a multi orifice seal 22 without surfaces creating any friction and operating with air pumped into the seal as indicated by an arrow 23. Part of the pressurized air flows in the direction of chamber 1 and part of it to the outside, thus sealing chamber 1 against loss of gas.

The combustible material to be gasified is fed into the chamber as described above with the help of the cavity piston through closure 8. Also possible is a feed screw. Material 12 first gets into section 4, which serves as drying zone. In a second phase the material is pushed into section 5, where the gasification process takes place.

Naturally, the highest temperature is to be found in section 5. In order to reduce heat loss through convection and radiation an additional inner cylinder 24 inside the chamber can be provided, which will have other functions as later described.

Also advantageous is the placement of a heat shield 26, which is connected to hollow support arms 20 and 20' and will protect stationary closure 9 from direct heat radiation and, at the same time, keeps the burning material during its gasification process in place, so it cannot enter section 6 until fully processed. A transfer of heat from section 5 to section 4 is desired to facilitate the drying and pre-heating process in section 4.

In section 6 the remaining ash and slag from the gasification process is carried into a collector 21 and from there conveyed to the outside.

The flow of the material inside chamber 1 is going from left to right in the drawing and is done with simple means installed inside the chamber. A small incline of the rotation axis, as known from a rotating kiln, can be sufficient but creates additional problems for the roller bearing mechanism. Special features to control the flow of the material are shown in the drawing:

Orifice restriction ring 3 between sections 4 and 5 is equipped with blades 28. The blades can be installed at different angles or can be designed to be adjustable. An adjustment can be made from the outside during operation if the flow speed of the material needs correction. Under normal circumstances the blades are pre-aligned for a process with a combustible material with a known characteristic, and they do not need any adjustments during operation. The same or similar blades can be installed on ring 3'.

In section 5 several agitation edges 29 are placed around the inner circumference of chamber 1 or, depending on the design, are mounted to inner cylinder 24 as shown in the drawing.

These agitation edges help to mix the combustible material during gasification and vector the material towards section 6. The edges lift part of the material up when rotating and, since they are installed at an angle, drop the material further along the flow path. Similar transport and lifting elements 27 can be installed in section 6 to carry ash and slag into a collector 21 and, if necessary, to divide the residue into smaller pieces. The speed of the material throughput in the chamber could also be regulated to produce charcoal as a desired by-product from wood pieces.

Chamber 1 designed with inner cylinder 24 has a circulation space 30, which can be used to pre-heat the chamber prior to start-up with waste heat from an external source, e.g. a diesel motor exhaust gas. This can be easily accomplished by using pipe 19 for the air supply. However, special connections (not shown) in chamber 1 could be used during a pre-heating phase when the chamber is not yet rotating. As long as a circulation of hot gases or air is established the chamber and the combustible material will be preheated.

The medium used to pre-heat the chamber can also be expelled again through pipe 31, normally used to collect the combustible gas. In this case the chamber can rotate which will result in a faster pre-heat process of material 12. With either method the start-up process can be accelerated to have the chamber ready to produce combustible gas for its intended purpose.

For start-up sections 4 and 5 are filled through stationary closure 8 with combustible material up to the inner diameter of rings 3 and 3'. Almost any combustible material is suitable for this initial firing of the chamber.

Also helpful is the use of a certain amount of waste oil that can be mixed with the initial charge prior to loading the chamber. Attention has to be paid to this mixing process to avoid thick layers of oil on the individual pieces of the material. Such precaution is necessary to avoid that the pieces stick together during loading or build large clumps during the initial firing, when the oil can produce sticky by-products.

Material 12 is also pre-heated and then ignited in section 5, which for example can be done with an electrical heating element or with a gas torch. Such devices can be inserted into the chamber through port holes (not shown in drawing) which are normally used for observation glass.

The ignition process can be assisted by blowing compressed air through a form part 25 connected to stationary hollow support arms 20 and 20' as done in a blacksmith's hearth.

Initial production of combustible gases, which in the early stages of the gasification process are not yet of the right gas composition are expelled through pipe 31 and flared off. As soon as the gas mix is concentrated enough with combustible gases the flare is valved off, and the gas is piped to its destination. Since the process is under pressure, resulting from the compressed air used as a fresh air supply, the combustible gas will escape without the need of an additional flow producing device. If necessary pipe 31 can be connected to a blower or a compressor to draw the gas out of the chamber. The start-up phase is completed once enough concentrated gas flows to the user.

The continuous gasification process sustains itself by using the heat simultaneously produced. During the gasification process combustible gas must be separated from the material exposed to the heat. With the control of air pressure and air volume an incomplete combustion process is maintained and regulated. By rotating the chamber material 12 is agitated and mixed, and new pre-heated material is fed into section 5 where the fire is slowly burning or smoldering. For better agitation control of the material an oscillation of the chamber is possible, which can be intermittent or continuous. Such an oscillation is turning the chamber forwards and backwards in adjustable increments.

By-products from gasification of coal can be used directly in the reactor and without great precaution. Especially suitable are small particles or even dust of coal, which normally would have to be pressed into briquettes. Such small particles have a tendency to ignite or even explode at relatively low temperatures of 200° C. and low pressure, making the handling and pressing of briquettes very dangerous.

Material with a high content of tar should be gasified at higher temperature, thus burning many of the impurities and, depending on the needed degree of pureness of the combustible gas, a secondary cleaning process may be avoided all together.

If the produced combustible gas is intended for a combustion engine, then the gas can be drawn out of the chamber through the hot burning material. At high temperatures tar and other unwanted or toxic substances are incinerated to a high degree, which is vital for a trouble-free operation of a combustion engine, especially if the gas is directly piped to such an engine. In a configuration of direct use the gas has to run through a cooling system, which for example can be a warm water or steam reactor, thus recycling the available energy. An additional gas cleaning system downstream of the chamber is always possible, but represents an additional process with disadvantages.

For the above described method of gathering the gas through the fire an additional form part 25' is fitted to arm 20' as shown in the drawing. In large rotation chambers several of such form parts 25 and 25' can be installed either next to each or behind each other. In all such an application it is advantageous not to install form parts 25 and 25' parallel to the rotation axis but at an angle to assist the movement of material 12.

The necessary fresh air supply for the gasification process is blown in through form part 25, and the combustible gas is drawn out through form part 25' as described above, thus eliminating its tar content.

Depending on size, mix, and composition of combustible material and, especially during prolonged operation, the form part 25' could get clogged or slag could build up. By injecting from time to time air or gas through part 25' will help alleviate such problems. Under certain circumstances it might be advisable to alternate the air supply and the gas return between the two arms 20 and 20'.

From a mechanical point of view such a switching mechanism is simple to install on the outside of the rotating chamber, where the pipe extension of arms 20 and 20' is easily accessible.

Another possibility is to use pipe 31 simultaneously with form part 25' for the gas return. The gas returned through pipe 31, flowing in an updraft mode through the ignited and preheated material, can be used for heating purposes in a boiler. The gas produced in a down draft mode through the burning mass and collected through arm 25' can be used in an engine after a possible cooling cycle. The necessary balance can be achieved by regulating the pressure of the two gas returns outside the chamber.

For different operations, as described in the above examples, it is possible to re-circulate a portion of the gas through the chamber by using pipe 19. By doing so, oxygen still contained in the gas mix will be used to produce additional carbon monoxide, therefore improving its desired concentration.

Such a re-circulation is very advantageous during an idle period, which could be used to fill a reservoir with concentrated, high energy gas. It is understood that a proportional amount of make-up air has to flow to the chamber for all the gas which is diverted to such a storage facility.

It is also understood that during such an idle period the supply of fresh material fed to the chamber has to be throttled accordingly. All such controls can easily be handled electronically and do not represent a problem with today's technology. The entire integrated control system of the gas reactor system is fairly simple during stationary operation and only involves the control of the fresh air supply and the gas return.

A shortage of combustible material 12 in chamber 5 will produce an unsaturated gas. To avoid poor gas quality the content of the gas is constantly monitored with instruments placed into the pipes coming from arm 20' and pipe 31. If the carbon monoxide content is too low the amount of the gas is throttled until the process is back in equilibrium.

The gas reactor has sufficient short-term capacity to balance a sudden need for more gas. Elevated or reduced need for gas will call for additional control procedures. Several steps alone or in combination are possible to offset such demand changes.

Elevated gas demand will call for increased supply of combustible material and will be handled by accelerating the feed cycles with the piston 13 through closure 8 as described above.

The reduction in size of the material used for feed stock or to change the mix of materials with a higher gas producing content is also possible.

An accelerated volume of feed stock material through the chamber can be achieved by rotating the chamber at increased revolutions, which are normally only a few rotations per hour. An adjustment in the angle of blades 28 is also possible. Further mentioned is the correction with a steeper incline of the chamber axis.

The balance of fresh air supply needed for increased gas production could result in an undesired high velocity of the air in the nozzles of form part 25. An air supply could be expanded by using part 25' in parallel or let air come into the chamber through pipe 19. An additional process configuration could be the use of pipe 19 and form part 25 to supply fresh air to the chamber and to return the gas through form part 25' and pipe 31. Such an arrangement will call for the necessary pipe and valve system.

For an accelerated gas return it will be advantageous to pre-heat the fresh air supply, which can be done outside the chamber with a gas/air heat exchanger, preferably installed downstream of any gas cleaning unit.

Another possibility is to pre-heat the air in circulation space 30 between inner cylinder 24 and chamber 1. Pre-heating the air in space 30 serves a triple purpose; cooling cylinder 24 and chamber 1, reducing loss of heat, and pre-warming the material in drying section 4. Such a combination is extremely useful when an accelerated gasification is called for.

When the gas is used in a combustion engine part of the exhaust gases could be piped back into the chamber. Such hot exhaust gases are still containing a fair amount of oxygen.

Such a process arrangement has several advantages. The gas reactor uses less fresh air, thus saving energy to compress the air supply. The fresh air used by the combustion engine is better utilized by a partial re-circulation. The pressure of the process in the rotation chamber can be elevated, and the chamber is re-using the waste heat from the engine exhaust, thus reducing the energy normally taken from the gasification process, therefore, resulting in a better overall efficiency of the gas reactor.

It is well known that a combustion engine exhaust still contains numerous toxic and hazardous substances as well as combustible gases and particles. A second smaller gas reactor could be used to handle all the exhaust gas mix from such an engine. The reactor would neutralize and completely burn all substances found in the exhaust gas mix. The new combustible gases produced in the smaller reactor would be used in a separate application.

If the chamber is fitted with inner cylinder 24 the exhaust gases of the combustion engine or any re-circulated gas, can be piped through space 30 to pre-warm and dry the material in section 4. The elevated temperature in space 30 is also reducing the loss of heat in section 5, since the chamber is better protected towards the outside.

By adding a seal ring to the inner cylinder at closures 8 and/or 9, which could be of the same orifice seal ring technology as described earlier, a different pressure level than in the chamber could be achieved for circulation space 30.

An additional advantage can be realized by heating the chamber externally at section 5. Such a heating could be accomplished by using a waste stream of a hot gas, or a gas burner could be installed.

The gas reactor can be operated at different pressure levels. By choosing the appropriate pressure level an additional compressor can be avoided for the transportation and preparation of a down stream user of the combustible gas. The pressure in the chamber will have to be adapted to the particular use in the down stream process. In general it is not desirable that an engine has to draw the gas itself, thus the operating pressure of the chamber will be somewhat higher than the desired pressure for the engine or the user's process. The operating pressure can easily be regulated with the pressure used for the supplied air. Cold air is normally easier and more economical compressed than a hot contaminated gas. The process pressure of chamber 1 is also a good parameter to control the thermal output of the gas reactor, which is especially important when the need for combustible gas fluctuates.

Given the opportunity to operate the reactor at elevated pressure opens up the possibility to inject different additives, which can neutralize toxic or hazardous substances.

The use of limestone to bind sulfur is well known. In addition to different catalysts, water and steam injection can result in desired chemical reactions to improve or obtain new gas compositions, neutralize unwanted substances, or to influence the combustion temperature of material 12. Catalysts can be added to material 12 already outside the chamber or can be supplemented later during the gasification process.

It might be advantageous to use more than three sections in the chamber for an elaborate gasification process. As an example, a process with four sections is shortly described.

The first section is used to dry the feed stock material by heating it to a level of approximately 300° C. During this heating process low boiling components will already change to a gas.

In the following gasification section an incomplete oxidation of the material is taking place, controlled by a minimal air supply at approximately 800° C. In a third section the combustible gases are drawn in a down draft mode through the very hot residue and burning material, and undesirable substances still in the gas are burned. By elevating the pressure of the process in the chamber many different chemical reactions are enhanced or made possible. In the fourth section ash and slag is collected and transported to the outside of the chamber.

In a variation to above concept and, especially designed for higher degree of gas purity, limestone is added to the feed stock material. In the third section superheated steam at 400° C., for example, is injected into the process to chemically bind the sulfur with the limestone, resulting in gypsum. As a by-product the gypsum is transported out of the chamber in the same way as the ash and slag. In a secondary process such a mix can be used to form insulating material.

The pressure in chamber 1 can be increased to a level, where it is possible to pipe the resulting gas directly to the combustion chambers of a gas turbine. The set-up of the gasification process and the design of the chamber will allow the possibility to add different fuels and air supply as needed for a gas turbine operation.

When the produced combustible gases are used in a combustion engine it is not only advisable to increase its pressure but also to cool the gas, whereas the waste heat can be used in a heat exchanger. The air supplied to the engine is pressurized, for example with a turbocharger, then mixed with the combustible gas from the gas reactor and piped to the engine. With such an arrangement a favorable comparison with an engine operating with conventional fuel is possible, and the power losses normally attributed to warm fuel gases are eliminated Cooled pressurized gases coming from the gas reactor and exit chamber 1 at an elevated pressure, can be sent through a pipeline to a distant user.

A chamber lined with a special stone for furnaces can be used to operate at higher temperature. High temperature very often allows to incinerate toxic and hazardous material to an inert substance. The heat used and produced in such a process can be converted and used in the chamber for different purposes.

Such a chamber will be longer and will be made up of different sections operating at different temperature levels and respective supplies of fresh air.

In such a process sections of lower temperature levels are arranged downstream. Since the chamber is pressurized it will be possible to draw gas for special purposes, such as for an expansion in the low pressure section of a gas turbine or by using the heat in a heat exchanger for a clean process.

If the gas is used in a pipeline or in a distribution network for a community, the same way as natural gas is normally handled, it is fed into a gas storage facility from where it will reach the users upon demand. Different control levels for the pressure in the storage facility can activate or deactivate the gas production.

In such an operation any carbon dioxide content in the gas is not desired and has to be separated from the mainstream of the gas.

In case the operation is idling for a short period of time, as in the case of a gas storage facility, it is advisable not to let the combustion extinguish in the chamber in order to be able to resume normal operation in only a short period of time. Such a smoldering fire can be achieved by controlling the supply of a minimum amount of air. The gas produced during that time has to be removed from the chamber through pipe 31 and flared off.

I claim:

1. A reactor for the continuous production of a combustible gas through the incomplete combustion of a combustible material and supplied air, and comprising
   a generally tubular combustion chamber (1) having two opposite ends and a portal (7) at each end thereof, with said combustion chamber being mounted for rotation about an axis which at least closely approximates the horizontal, a stationary closure (8,9) closing each of said portals, means for feeding a combustible material into the interior of said combustion chamber through one of said closures, means for delivering air into the interior of the combustion chamber so as to pass through the combustible material in said combustion chamber in an up draft mode, or a down draft mode, or in a combination of an up draft mode and a down draft mode, and means for withdrawing the gaseous products of combustion through the other of said closures, and means for slowly rotating or oscillating the combustion chamber about said axis.

2. The reactor as defined in claim 1 wherein said combustion chamber includes means for moving the combustible material from a location adjacent said one of said closures toward the other of said closures during rotation of said combustion chamber.

3. The reactor as defined in claim 2 wherein the interior of said combustion chamber is divided into a first section (4) adjacent said one of said closures and which serves as a drying zone, a second section (5) located medially along the length of the combustion chamber and which serves as a combustion zone, and a third section (6) adjacent said other of said closures and which serves as an ash collection zone.

4. The reactor as defined in claim 3 further comprising a heat shield (26) mounted in the interior of said combustion chamber between said second and third sections.

5. The reactor as defined in claim 3 wherein said combustion chamber is divided into said first, second, and third sections by means of a pair of rings (3,3') mounted within said combustion chamber, and wherein said means for moving the combustible material from a location adjacent said one of said closures toward the other of said closures during rotation of said combustion chamber includes a plurality of transportation blades (28) mounted to each of said rings.

6. The reactor as defined in claim 1 wherein said one of said closures comprises a moveable feed stock piston (13) for delivering the combustible material into the combustion chamber while maintaining the associated portal closed to the free passage of air.

7. The reactor as defined in claim 1 further comprising means for heating the exterior of the combustion chamber.

8. The reactor as defined in claim 1 further comprising a multi orifice seal between each of said portals and the associated closure, with each of said multi orifice seals including a pressurized air source.

9. The reactor as defined in claim 1 wherein said combustion chamber comprises an outer tubular cylinder and an inner tubular cylinder (24) mounted coaxially within said outer cylinder so as to define a space (30) therebetween.

10. The reactor as defined in claim 1 wherein said means for withdrawing at least a portion of the products of combustion through the other of said closures comprises a gas pipe (20,30') extending through said other of said closures.

11. The reactor as defined in claim 1 further comprising a collector (21) for removing non-gaseous products of combustion from the combustion chamber.

12. The reactor as defined in claim 1 further comprising means for bringing the delivered air into heat exchange relation with the withdrawn gaseous products of combustion so as to cool the latter.

13. The reactor as defined in claim 1 further comprising means for controlling the volume of the delivered air with respect to the volume of the withdrawn gaseous products of combustion.

14. The reactor as defined in claim 1 further comprising means for re-circulating at least a portion of the withdrawn gaseous products of combustion through the combustion chamber.

15. The reactor as defined in claim 1 further comprising means for blending at least one additive to the combustible material before it is fed into the interior of the combustion chamber.

16. A reactor for the continuous production of a combustible gas through the incomplete combustion of a combustible material and supplied air, and comprising a generally tubular combustion chamber (1) having two opposite ends and a portal (7) at each end thereof, with said combustion chamber being mounted for rotation about an axis which at least closely approximates the horizontal, a stationary closure (8,9) closing each of said portals, means for feeding a combustible material into the interior of said combustion chamber through one of said closures and so that the combustible material collects in a lower portion of said combustion chamber, first and second gas pipes (20,20') extending through the other of said closures and into the combustion chamber, said first and second gas pipes each including an outlet located in said lower portion of said combustion chamber, means for selectively delivering air into the interior of the combustion chamber through both of said pipes or through one of said pipes while withdrawing at least a portion of the gaseous products of combustion through the other of said pipes, and means for slowly rotating or oscillating the combustion chamber about said axis.

17. The reactor as defined in claim 16 further comprising a third gas pipe (31) extending through the other of said closures and into the interior of said combustion chamber for removing gaseous products of combustion from the combustion chamber.

18. The reactor as defined in claim 17 wherein the interior of said combustion chamber is divided into a first section (4) adjacent said one of said closures and which serves as a drying zone, a second section (5) located medially along the length of the combustion chamber and which serves as a combustion zone, and a third section (6) adjacent said other of said closures and which serves as an ash collection zone, and wherein said first and second gas pipes extend into said second section of said combustion chamber.

19. The reactor as defined in claim 17 wherein said third pipe includes an inlet which is at a location above the outlets of said first and second pipes.

20. The reactor as defined in claim 1 further comprising means for adjustably controlling the operating pressure in the combustion chamber.

* * * * *